US008821283B2

(12) United States Patent
Dicillo et al.

(10) Patent No.: US 8,821,283 B2
(45) Date of Patent: Sep. 2, 2014

(54) WAGERING GAME AUDIO ENDING IN KEY OF CURRENT STATE

(75) Inventors: Michael V. Dicillo, Norridge, IL (US); Howard R. Pfeifer, Chicago, IL (US)

(73) Assignee: WMS Gaming, Inc., Waukegan, IL (US)

( * ) Notice: Subject to any disclaimer, the term of this patent is extended or adjusted under 35 U.S.C. 154(b) by 211 days.

(21) Appl. No.: 13/452,159

(22) Filed: Apr. 20, 2012

(65) Prior Publication Data

US 2013/0281210 A1 Oct. 24, 2013

(51) Int. Cl.
*A63F 13/00* (2014.01)

(52) U.S. Cl.
USPC .................................. 463/35; 463/20; 463/30

(58) Field of Classification Search
USPC .................................. 463/16, 20, 25, 30, 35
See application file for complete search history.

(56) References Cited

U.S. PATENT DOCUMENTS 6,554,703 B1 4/2003 Bussick et al.
6,561,908 B1 5/2003 Hoke
6,638,169 B2 10/2003 Wilder et al.
6,729,618 B1 5/2004 Koenig et al.
6,729,955 B2 5/2004 Bennett et al.
6,769,985 B1 8/2004 Laakso et al.
6,843,723 B2 1/2005 Joshi
6,848,996 B2 2/2005 Hecht et al.
6,923,718 B2 8/2005 Brossard
6,935,955 B1 8/2005 Kaminkow et al.
6,939,226 B1 9/2005 Joshi
6,960,136 B2 11/2005 Joshi et al.
6,974,385 B2 12/2005 Joshi et al.
6,991,543 B2 1/2006 Joshi
7,105,736 B2 9/2006 Laakso
7,355,112 B2 4/2008 Laakso et al.
7,364,508 B2 4/2008 Loose et al.
7,367,886 B2 5/2008 Loose et al.
7,479,063 B2 1/2009 Pryzby et al.
2005/0054440 A1 3/2005 Anderson et al.
2005/0124415 A1 6/2005 Centuori et al.
2005/0164785 A1 7/2005 Connelly
2005/0164786 A1 7/2005 Connelly
2005/0164787 A1 7/2005 Connelly
2005/0164788 A1 7/2005 Grabiec (Continued)

OTHER PUBLICATIONS

"International Application Serial No. PCT/US2008/012565 Search Report", Jan. 15, 2009 , 4 pages.

(Continued)

*Primary Examiner* — James S McClellan
(74) *Attorney, Agent, or Firm* — DeLizio Gilliam, PLLC

(57) ABSTRACT

In a wagering game machine, operations and systems are disclosed for ending wagering game audio in a key of the current state. In one embodiment, the use of markers to denote the state of a music file enables following the continuous music and ending wagering game bang-up audio in whatever key the continuous music is in at the precise moment the bang-up ends. The continuous music, bang-ups and marker file are all started at the same time and may be the same length. The continuous music is audible, the bang-ups are heard by raising the volume when programmatically called for, and the marker file continuously sends out signals at a set rate which the code then interprets to determine the state of the song to trigger the appropriate musical ending. When the bang-up ends it can then be played in the key corresponding to the current state of the music.

20 Claims, 5 Drawing Sheets

(56) References Cited

U.S. PATENT DOCUMENTS

| | | | | |
|---|---|---|---|---|
| 2005/0277469 | A1 | 12/2005 | Pryzby et al. | |
| 2005/0277496 | A1 | 12/2005 | Pryzby et al. | |
| 2005/0282631 | A1 | 12/2005 | Bonney et al. | |
| 2006/0009285 | A1 | 1/2006 | Pryzby et al. | |
| 2006/0046829 | A1 | 3/2006 | White | |
| 2007/0006708 | A1 | 1/2007 | Laakso | |
| 2007/0036368 | A1 | 2/2007 | Hettinger et al. | |
| 2007/0173309 | A1 | 7/2007 | Rigsby | |
| 2007/0293304 | A1 | 12/2007 | Loose et al. | |
| 2008/0113716 | A1 | 5/2008 | Beadell et al. | |
| 2008/0139284 | A1* | 6/2008 | Pryzby et al. | 463/20 |
| 2008/0161108 | A1 | 7/2008 | Dahl et al. | |
| 2008/0242411 | A1 | 10/2008 | Connelly | |
| 2009/0170597 | A1 | 7/2009 | Bone et al. | |
| 2009/0186696 | A1 | 7/2009 | Shai-Hee | |
| 2009/0298579 | A1 | 12/2009 | Radek et al. | |
| 2010/0273555 | A1* | 10/2010 | Beerhorst | 463/35 |

OTHER PUBLICATIONS

"International Application Serial No. PCT/US2008/012565 Written Opinion", Jan. 15, 2009 , 6 pages.

* cited by examiner

WAGERING GAME AUDIO ENDING IN KEY OF CURRENT STATE

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2012, WMS Gaming, Inc.

CROSS-REFERENCE TO RELATED APPLICATIONS

This patent application is related to U.S. patent application Ser. No. 12/742,074 filed Nov. 7, 2008, and entitled “WAGERING GAME BONUS SOUND INTEGRATION,” the disclosure of which is incorporated herein by reference.

FIELD

Embodiments of the inventive subject matter relate generally to wagering game systems, and more particularly to wagering game systems that include bonus audio presentations.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for wagering game machine manufacturers to continuously develop new games and gaming enhancements that will attract frequent play.

BRIEF DESCRIPTION OF THE FIGURES

Embodiments of the invention are illustrated in the Figures of the accompanying drawings in which.

DESCRIPTION OF THE EMBODIMENTS

Figure 1:
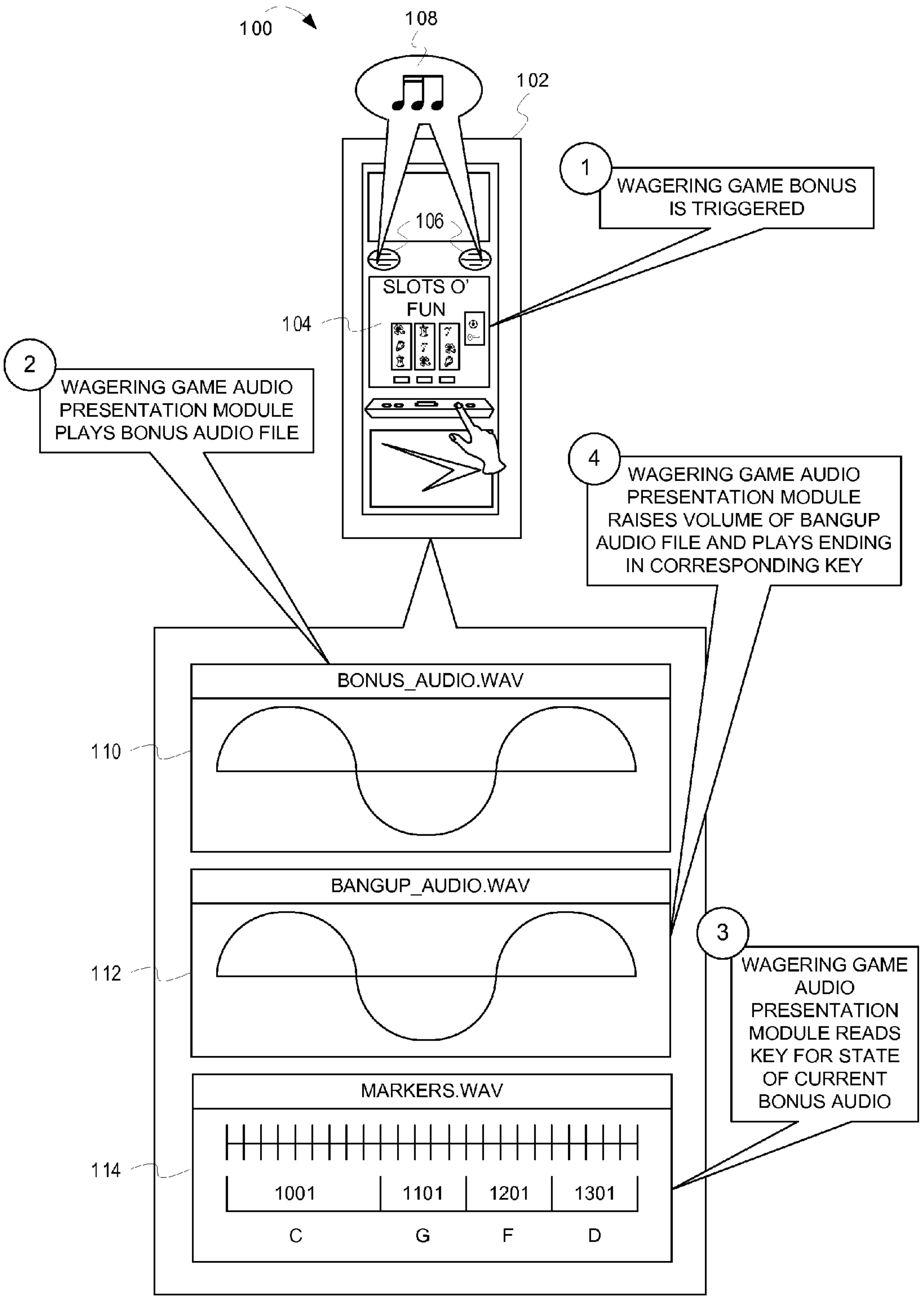
FIGS. 1 and 2 are diagrammatic illustrations of ending wagering game audio in key of current state in a wagering game machine, according to some example embodiments.

This description of the embodiments is divided into five sections. The first section provides an introduction to some example embodiments, while the second section describes example operations performed by some embodiments. The third section describes wagering game machine architectures while the fourth section describes example wagering game machines. The fifth section presents some general comments.

Introduction

This section provides an introduction to some embodiments. In many wagering games, such as video poker or reel slot machine wagering games, distinct bonus games are featured in addition to traditional base game play. The bonus game may be triggered by passage of time, a certain amount of game play or wagering, or by other events, and gives the game player an opportunity to earn winnings beyond what has already been won in regular game play. In some embodiments, bonus games include special multimedia presentation elements, including a bonus game audio track such as music, and other sounds such as credit bang-up sounds that play as bonus credits accumulate or are added to a game player’s winnings.

In one such bonus game, the bonus track can be a song that is played repeatedly during the bonus game, or that “loops” by playing over again once the end of the track is reached. In some embodiments, the bonus track may be related to a theme of the wagering game, such as wild west music for a western-themed game, music from a movie for a movie-themed game, or music having a feel and tempo appropriate to a particular game theme. In a typical bonus game, the accumulated bonus credits or winnings are added to the game player’s credits, such as by adding them at the conclusion of the bonus game or at various points during bonus game play. The credits are often incremented in steps rather than added all at once, for dramatic effect and to demonstrate the magnitude of the bonus winnings, in a process known as credit bang-up or simply bang-up. The credit bang-up is often accompanied by sound, such as a bell ringing as each winnings increment is added to the game player’s total credits or winnings.

But, the credit bang-up sound can also be a distraction from the game’s theme, such as from the bonus game soundtrack or other multimedia elements of the bonus game presentation. In traditional wagering game machines, the bang-up sound often obscures the bonus music that it plays over because the traditional bang-up in many wagering games has typically involved repetition of a simple musical phrase over and over and is not synchronized with any other sounds. Sometimes that is intentional and effective. However, there is a problem if the bonus tune moves around a great deal harmonically, that is, if it changes tonality or key centers. When a repetitive bang-up is introduced over such a tune, the clashing effect can be grating and unpleasing to the ear.

In the past, solutions have been twofold—in some examples, bang-up endings were restricted to being either a non-pitched instrument, as to not interfere with the chord changes in the continuous music, or to be a pitched instrument that could only end in one key without knowing where the continuous music was melodically. Additional solutions include employing songs staying in a certain tonal area to accommodate the simple bang-ups, or non-musical bang-up sounds that will not clash with the tone or rhythm of other music.

These solutions either do not allow for flexibility in the key of the bang-up ending sound or do not address the harmonic clashes that happen when the bang-up ends at some random point within the harmonic structure of the bonus tune. Some embodiments of the invention therefore seek to better integrate credit bang-up sounds in a bonus game, such as by ending a credit bang-up sound in the particular key that the bonus game track is played in.

In one such embodiment, the use of markers to denote the "state" of a music file enables following the continuous music and ending the bang-ups in whatever key the continuous music is in at the precise moment the bang-up ends. The continuous music, bang-ups and silent marker file are all started at the same time and can be exactly the same length. The continuous music is audible, the bang-ups are heard (by raising the volume) when programmatically called for, and the marker file continuously sends out signals at a set rate which the code then interprets to determine the "state" of the song to trigger the appropriate musical ending. The bang-up sound thereby provides a distinct audio indicator of credit bang-up, while being consistent with the bonus song and theme of the wagering game.

FIG. 1 is a diagrammatic illustration of ending wagering game audio in key of current state in a wagering game machine, according to some example embodiments. FIG. 1 includes a wagering game machine 102 including a display device 104 and audio output device 106. In some embodiments, the audio output device 106 presents an audio presentation 108 to the player. FIG. 1 also includes a bonus audio file 110, a bang-up audio file 112, and an audio marker file 114. In FIG. 1 operations occur in 4 stages.

In stage 1, the wagering game bonus is triggered. As discussed supra, this may occur due to a passage of time, a certain amount of game play or wagering, or because of other events. Typically, once the wagering game bonus is triggered an indication is displayed to the player via the display device 104 that the player has entered the bonus game. Additionally, or perhaps even in place of, there may be an audio indication 108 via the audio output device 106 that the player has entered the bonus game.

Once the game play enters the bonus game, in stage 2 a wagering game audio presentation module may initiate a bonus game audio presentation 108. As discussed supra, this typically consists of a bonus audio track file 110 that is played continuously during the bonus game and loops upon completion. In some embodiments, a bang-up audio track file 112 is initiated in sequence with the bonus audio track file 110. The bang-up audio track file 112 can be equal in length to the bonus audio track file 110 and also loop upon completion, thereby ensuring that the bang-up audio track file 112 and bonus audio track file 110 remain synchronized throughout the entire bonus game presentation. In some embodiments, the bang-up audio track file 112 will remain muted, such that the bang-up audio is only perceptible to the player when a bang-up event (e.g., a credit win, etc.) occurs and the wagering game audio presentation module raises the volume that the bang-up audio file 112 is played accordingly.

When such a bang-up event occurs, the wagering game audio presentation module, in stage 3, reads the audio marker file 114. The audio marker file 114 is itself an audio file like the bonus audio file 110 and the bang-up audio file 112, however in some embodiments the audio marker file 114 contains no audio, but rather timing markers which correspond to various points in time in the bonus audio file 110 and bang-up audio file 112. When equal in length, looped upon completion, and initiated in sequence with the bonus audio file 110 and bang-up audio file 112, the audio marker file can also remain synchronized with the bonus audio file 110 and bang-up audio file 112 for the duration of the bonus game presentation. As the audio marker file 114 can be synchronized with the bonus audio file 110, once the bang-up event occurs the wagering game audio presentation module can consult the audio marker file 114 for the exact point in time which the bang-up event occurred and the audio marker file 114 can also contain the key information for the bonus audio file 110 at that particular point in time.

Finally, in stage 4, with the bonus audio key information read from the audio marker file 114, the wagering game audio presentation can instruct the bang-up audio file 112 to be played at an increased volume, such that the player can audibly detect the bang-up sound 108 that indicates a bang-up event has occurred within the bonus, and to end the bang-up in the key corresponding to current state of the bonus audio.

Figure 2:
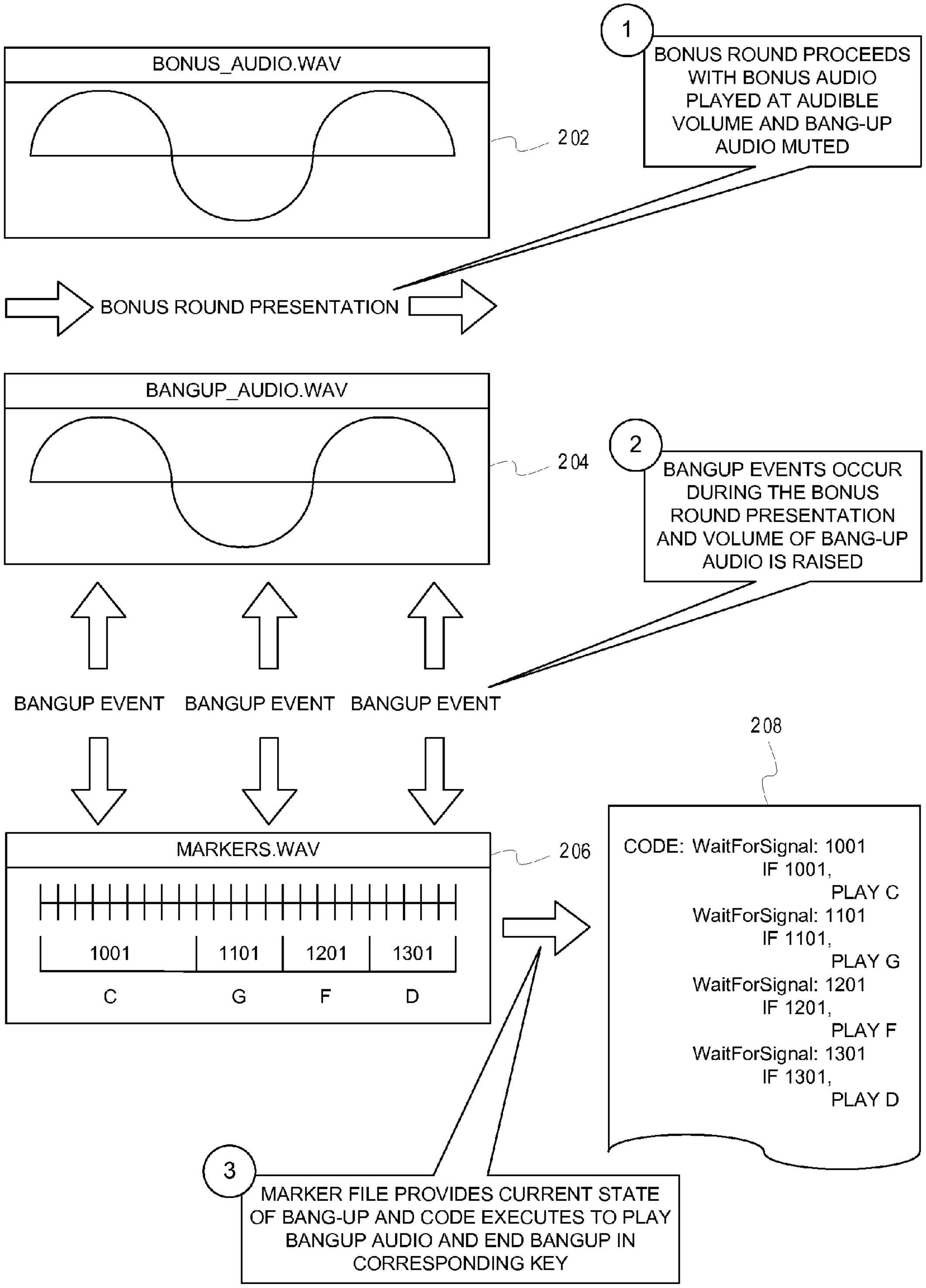

FIG. 2 is a diagrammatic illustration of ending wagering game audio in key of current state in a wagering game machine, according to some example embodiments. FIG. 2 includes a bonus audio file 202, a bang-up audio file 204, an audio marker file 206, and wagering game code 208. In FIG. 2 operations occur in 3 stages.

As discussed supra, the bonus audio presentation commences once the wagering game has entered the bonus round presentation portion of the wagering game. Once bonus play has begun, in stage 1, bonus audio file 202 begins to play at an audible volume and will continue to play for the duration of the bonus round. In some embodiments, when the bonus audio file 202 has reached the end of the file it will loop, such that it begins play again at the beginning of the bonus audio file 202 as the bonus round presentation continues.

In some embodiments, when the bonus audio file 202 begins to be played the bang-up audio file 204 and audio marker file 206 also begins to be played at the same time. Also, the bang-up audio file 204 and audio marker file 206 can be the exact same length in duration as the bonus audio file 202 and like the bonus audio file 202, the bang-up audio file 204 and audio marker file 206 can loop once they have reached the end of the file. In some embodiments, the bang-up audio file 204 may be muted so as to make it inaudible as it plays.

In stage 2 the various bang-up events (e.g., a credit win, etc.) occur at various times throughout the bonus round presentation. It should be noted that, as depicted in FIG. 2, in certain embodiments the bang-up event occurs at the same time in all three files (i.e., the bonus audio file 202, bang-up audio file 204, and audio marker file 206). In some embodiments, when the bang-up event occurs the volume of the bang-up audio file 204 may be raised so as to make it audible as it plays.

When the bang-up event occurs, the audio marker file 206 is read, in stage 3. The information provided in the audio marker file 206, the signal value mapping to the point in time in the audio marker file 206 when the bang-up event occurs, is passed to the code 208. Upon execution of the code 208, the output is the key in which to play the bang-up audio file 204 ending. This key value will harmonize with the bonus audio file 202 when the bang-up audio 204 ends, as it corresponds to the key of the bonus audio file 202 at the point in time that the bang-up event occurs.

Various embodiments of the invention provide a variety of benefits to the game designer, and to the game player. One benefit of some embodiments is that the bang-up sound ending can now follow any bonus tune harmonically. There is no more randomness in how the bang-up ending will sound when it is introduced over the bonus tune, therefore the composer is completely freed up to write more creatively. Also, complex licensed music that may be purchased could now be used as bonus music and interact with the bang-up ending in an aesthetically pleasing way. Finally, the bang-up ending sound can now complement the bonus tune, such as where the bang-up sound introduces repetitive bell chimes, claps, horn stabs and a crowd shouting "Go! Go! Go!" over a rockabilly bonus tune.

Although FIGS. 1 and 2 describes some embodiments, the following sections describe many other features and embodiments.

Example Operations

This section describes operations associated with some example embodiments. In the discussion below, the flow diagrams are described with reference to block diagrams presented herein. However, in some embodiments, the operations can be performed by logic not described in the block diagrams.

In certain embodiments, the operations can be performed by executing instructions residing on machine-readable storage media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform more or less than all the operations shown in any flow diagram.

Figure 3:
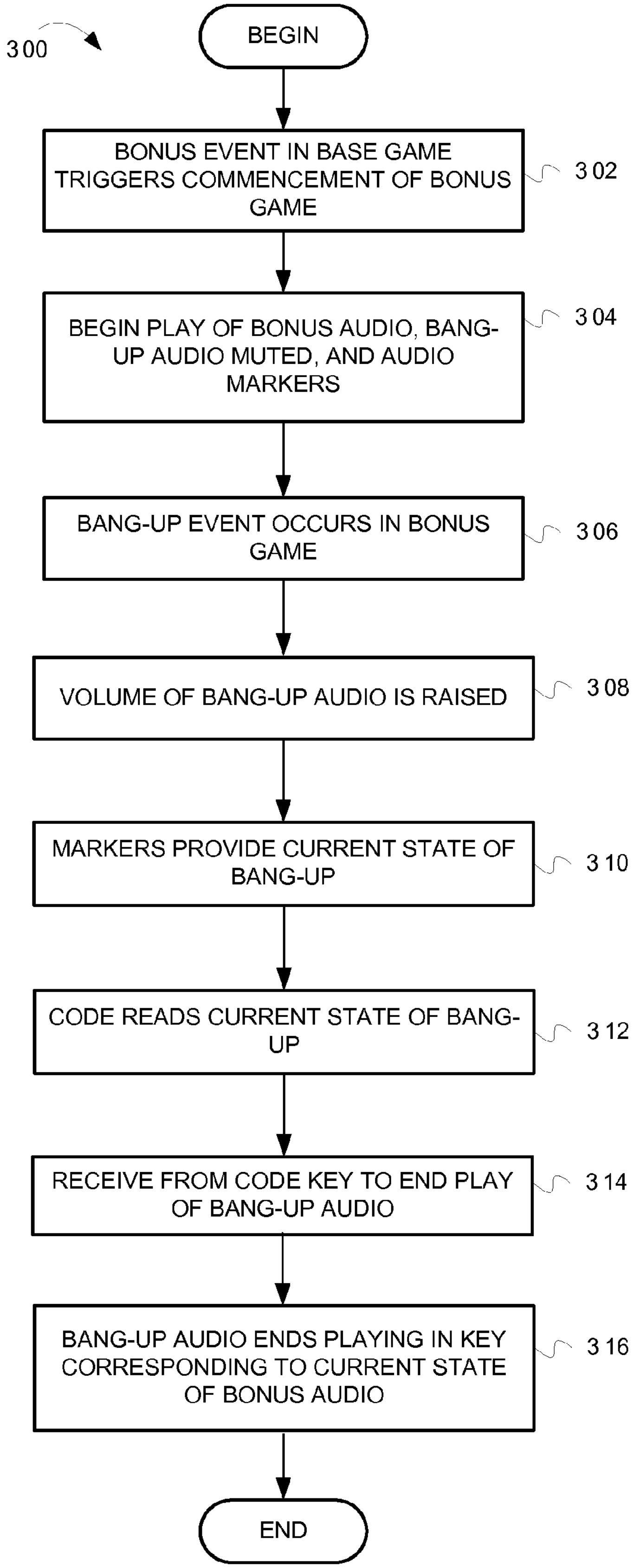
FIG. 3 is a flowchart of operations for ending wagering game audio in key of current state in a wagering game machine, according to some example embodiments.

FIG. 3 is a flowchart of operations for ending wagering game audio in key of current state in a wagering game machine, according to some example embodiments. The operations of the flow diagram 300 begin at block 302.

At block 302, the bonus game is triggered from within the base game. This triggering may occur due to a passage of time, a certain amount of game play or wagering, or because of other events. Operations continue at block 304.

At block 304, the play of the bonus audio file, bang-up audio file, and audio marker file are all initiated. In some embodiments, the files are all the same length in duration and play continuously throughout the bonus presentation, looping back to the beginning of the file, if necessary. Here, the bonus audio file is initially audible, whereas the bang-up audio file is muted until such time as a bang-up event occurs. The audio marker file contains no audio so it too is inaudible. Operations continue at block 306.

At block 306, a bang-up event occurs. Typically this is a credit win resulting in an incrementing of the credit meter. Operations continue at block 308.

At block 308, the volume of the bang-up audio file is raised such that it is now audible in conjunction with the occurrence and duration of the bang-up event. Operations continue at block 310

At block 310, the audio marker file provides the current state of the bang-up upon the bang-up event occurring. The audio marker file provides the current state at the point in time that the bang-up event occurred for the state corresponding to that particular point in time. Operations continue at block 312.

At block 312, the current state obtained from the audio marker file is input to code. Upon execution, the code outputs the key that the bang-up audio file should be ended in. This key corresponds to the key of the bonus audio file at the time of the bang-up event. Operations continue at block 314.

At block 314, the key value is received. The key value indicates the key in which to end play of the bang-up audio. Operations continue at block 316.

At block 316, the bang-up audio ends played in the key value corresponding to the current state of the bonus audio, thereby harmonizing the bang-up audio ending with the bonus audio being played at the time of the bang-up event. The operations of the flow diagram 300 are complete.

Wagering Game Machine Architectures

Figure 4:
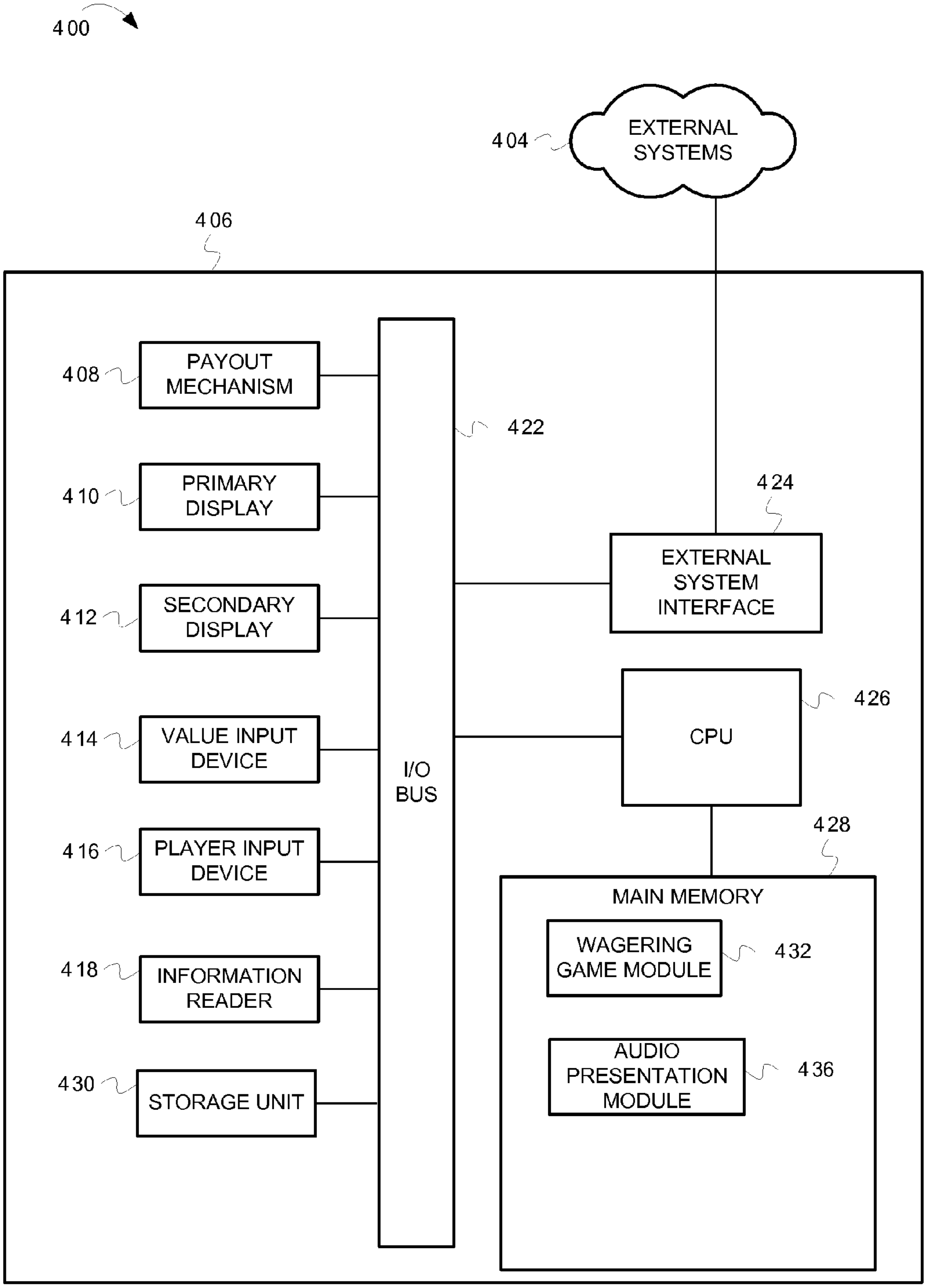
FIG. 4 is a block diagram illustrating a wagering game machine architecture, according to some example embodiments.

FIG. 4 is a block diagram illustrating a wagering game machine architecture, according to some example embodiments. As shown in FIG. 4, the wagering game machine architecture 400 includes a wagering game machine 406, which includes a central processing unit (CPU) 426 connected to main memory 428. The CPU 426 can include any suitable processor, such as an Intel® Pentium processor, Intel® Core 2 Duo processor, AMD Opteron™ processor, or UltraSPARC processor. The main memory 428 includes a wagering game unit 432.

In one embodiment, the wagering game unit 432 can present wagering games, such as video poker, video black jack, video slots, video lottery, etc., in whole or part.

The CPU 426 is also connected to an input/output (I/O) bus 422, which can include any suitable bus technologies, such as an AGTL+ frontside bus and a PCI backside bus. The I/O bus 422 is connected to a payout mechanism 408, primary display 410, secondary display 412, value input device 414, player input device 416, information reader 418, and storage unit 430. The player input device 416 can include the value input device 414 to the extent the player input device 416 is used to place wagers. The I/O bus 422 is also connected to an external system interface 424, which is connected to external systems 404 (e.g., wagering game networks).

In one embodiment, the wagering game machine 406 can include additional peripheral devices and/or more than one of each component shown in FIG. 4. For example, in one embodiment, the wagering game machine 406 can include multiple external system interfaces 424 and/or multiple CPUs 426. In one embodiment, any of the components can be integrated or subdivided.

In some embodiments, the wagering game machine 406 includes an audio presentation module 436. The audio presentation module 436 can coordinate the playing of multiple audio files simultaneously, adjusting the volume and key of the audio files. Additionally, in some embodiments the audio presentation module 436 can perform programmatic operations such as reading files, calling code modules, and passing and receiving values between the audio presentation module 436 and the code module(s).

Any component of the architecture 400 can include hardware, firmware, and/or machine-readable media including instructions for performing the operations described herein. Machine-readable media includes any mechanism that provides (i.e., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

Example Wagering Game Machines

Figure 5:
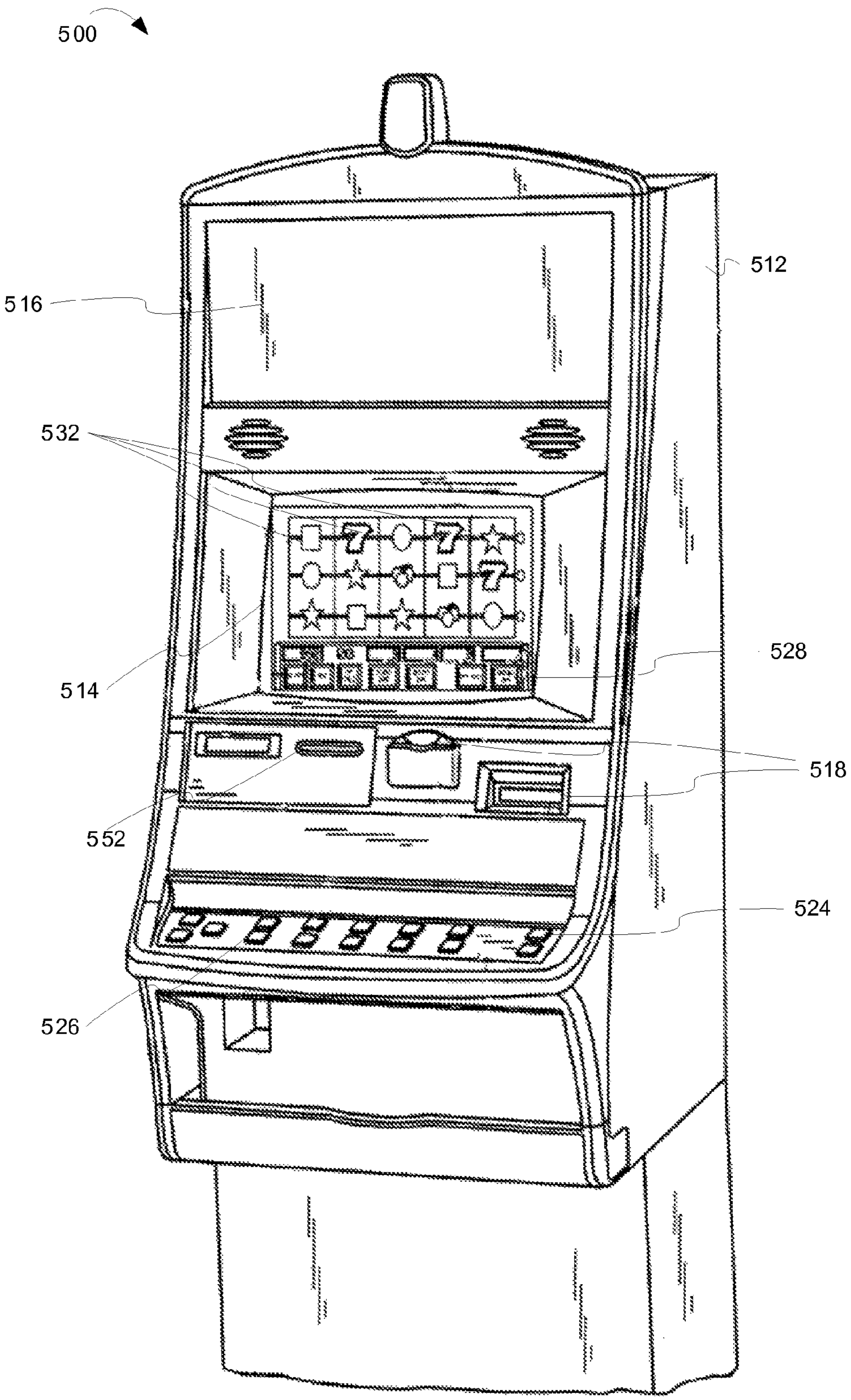
FIG. 5 is a perspective view of a wagering game machine, according to some example embodiments.

FIG. 5 is a conceptual diagram that illustrates an example of a wagering game machine 500, according to some embodiments. Referring to FIG. 5, the wagering game machine 500 can be used in gaming establishments, such as casinos. According to some embodiments, the wagering game machine 500 can be any type of wagering game machine and can have varying structures and methods of operation. For example, the wagering game machine 500 can be an electro-mechanical wagering game machine configured to play mechanical slots, or it can be an electronic wagering game machine configured to play video casino games, such as blackjack, slots, keno, poker, blackjack, roulette, etc.

The wagering game machine 500 comprises a housing 512 and includes input devices, including value input devices 518 and a player input device 524. For output, the wagering game machine 500 includes a primary display 514 for displaying information about a basic wagering game. The primary display 514 can also display information about a bonus wagering game and a progressive wagering game. The wagering game machine 500 also includes a secondary display 516 for displaying wagering game events, wagering game outcomes, and/or signage information. While some components of the wagering game machine 500 are described herein, numerous other elements can exist and can be used in any number or combination to create varying forms of the wagering game machine 500.

The value input devices 518 can take any suitable form and can be located on the front of the housing 512. The value input devices 518 can receive currency and/or credits inserted by a player. The value input devices 518 can include coin acceptors for receiving coin currency and bill acceptors for receiving paper currency. Furthermore, the value input devices 518 can include ticket readers or barcode scanners for reading information stored on vouchers, cards, or other tangible portable storage devices. The vouchers or cards can authorize access to central accounts, which can transfer money to the wagering game machine 500.

The player input device 524 comprises a plurality of push buttons on a button panel 526 for operating the wagering game machine 500. In addition, or alternatively, the player input device 524 can comprise a touch screen 528 mounted over the primary display 514 and/or secondary display 516.

The various components of the wagering game machine 500 can be connected directly to, or contained within, the housing 512. Alternatively, some of the wagering game machine's components can be located outside of the housing 512, while being communicatively coupled with the wagering game machine 500 using any suitable wired or wireless communication technology.

The operation of the basic wagering game can be displayed to the player on the primary display 514. The primary display 514 can also display a bonus game associated with the basic wagering game. The primary display 514 can include a cathode ray tube (CRT), a high resolution liquid crystal display (LCD), a plasma display, light emitting diodes (LEDs), or any other type of display suitable for use in the wagering game machine 500. Alternatively, the primary display 514 can include a number of mechanical reels to display the outcome. In FIG. 5, the wagering game machine 500 is an "upright" version in which the primary display 514 is oriented vertically relative to the player. Alternatively, the wagering game machine can be a "slant-top" version in which the primary display 514 is slanted at about a thirty-degree angle toward the player of the wagering game machine 500. In yet another embodiment, the wagering game machine 500 can exhibit any suitable form factor, such as a free standing model, bar top model, mobile handheld model, or workstation console model.

A player begins playing a basic wagering game by making a wager via the value input device 518. The player can initiate play by using the player input device's buttons or touch screen 528. The basic game can include arranging a plurality of symbols 532 along a pay line, which indicates one or more outcomes of the basic game. Such outcomes can be randomly selected in response to player input. At least one of the outcomes, which can include any variation or combination of symbols, can trigger a bonus game.

In some embodiments, the wagering game machine 500 can also include an information reader 552, which can include a card reader, ticket reader, bar code scanner, RFID transceiver, or computer readable storage medium interface. In some embodiments, the information reader 552 can be used to award complimentary services, restore game assets, track player habits, etc.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer readable program code embodied in the medium. The described embodiments may be provided as a computer program product, or software, that may include a machine-readable storage medium having stored thereon instructions, which may be used to program a computer system (or other electronic device(s)) to perform a process according to embodiments(s), whether presently described or not, because every conceivable variation is not enumerated herein. A machine-readable storage medium includes any mechanism that stores information in a form readable by a machine (e.g., a wagering game machine, computer, etc.). For example, machine-readable storage media includes read only memory (ROM), random access memory (RAM), magnetic disk storage media, optical storage media (e.g., CD-ROM), flash memory machines, erasable programmable memory (e.g., EPROM and EEPROM); etc. Some embodiments of the invention can also include machine-readable signal media, such as any media suitable for transmitting software over a network.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims. Each of the embodiments described herein are contemplated as falling within the inventive subject matter, which is set forth in the following claims.

The invention claimed is:

1. A computerized wagering game system comprising:

at least one input device, one or more audio output devices, one or more processors, at least one memory device storing program code that, when executed by the one or more processors, cause the wagering game system to perform operations to present audio, the program code including:

program code to receive a wager from a player to initiate a wagering game upon which monetary value can be wagered; and program code to simultaneously play, via the one or more audio output devices, a synchronized bonus song and a bang-up audio track such that the bang-up audio track ends in a first key corresponding harmonically to a second key of the bonus song at a particular point in the bonus song.

2. The computerized wagering game system of claim 1, wherein the wagering game system is operable to simultaneously play a synchronized audio marker file.

3. The computerized wagering game system of claim 2, wherein the audio marker file contains signal information at particular points in the audio marker file.

4. The computerized wagering game system of claim 1, wherein at least one of the bonus song and the bang-up audio track are prerecorded audio tracks.

5. The computerized wagering game system of claim 1, wherein both the bonus song and the bang-up audio track are the same length and begin at the same time.

6. The computerized wagering game system of claim 5, wherein playing the bonus song triggers simultaneous play of the bang-up audio track.

7. The computerized wagering game system of claim 1, wherein the bang-up audio track is played by selectively varying the volume of the playing bang-up audio track in accordance with the duration of a credit bang-up.

8. A method of operating a wagering game machine having one or more processors, the method comprising:

presenting, using at least one of the processors, by the one or more processors a wagering game upon which monetary value can be wagered; and simultaneously playing, using at least one of the processors, a synchronized bonus song and a bang-up audio track, such that the bang-up audio track ends in a first key corresponding harmonically to a second key of the bonus song at a particular point in the bonus song.

9. The method of operating a wagering game machine of claim 8, further comprising simultaneously playing a synchronized audio marker file.

10. The method of operating a wagering game machine of claim 9, wherein the audio marker file contains signal information at particular points in the audio marker file.

11. The method of operating a wagering game machine of claim 8, wherein both the bonus song and the bang-up audio track are the same length and begin at the same time.

12. The method of operating a wagering game machine of claim 11, wherein playing the bonus song triggers simultaneous play of the bang-up audio track.

13. The method of operating a wagering game machine of claim 8, wherein the bang-up audio track is played by selectively varying the volume of the playing bang-up audio track in accordance with the duration of a credit bang-up.

14. One or more non-transitory machine-readable storage media including instructions which, when execute by one or more processors, cause the one or more processors to perform operations comprising:

presenting a wagering game upon which monetary value can be wagered;

presenting a bonus game in association with the wagering game;

simultaneously presenting a bonus song with an audio track that accompanies graphical presentation of credits awarded for the bonus game, wherein the audio track ends in a first musical key corresponding harmonically to a second musical key of the bonus song at a particular point in the bonus song.

15. The one or more non-transitory machine-readable storage media of claim 14, wherein the simultaneously presenting includes simultaneously playing a synchronized audio marker file.

16. The one or more non-transitory machine-readable storage media of claim 15, wherein the audio marker file contains signal information at particular points in the audio marker file.

17. The one or more non-transitory machine-readable storage media of claim 14, wherein at least one of the bonus song and the audio track are prerecorded audio tracks.

18. The one or more non-transitory machine-readable storage media of claim 14, wherein both the bonus song and the audio track are the same length and begin at the same time.

19. The one or more non-transitory machine-readable storage media of claim 18, wherein presenting the bonus song causes simultaneous presentation of the audio track.

20. The one or more non-transitory machine-readable storage media of claim 14, wherein presentation of the audio track selectively varies volume of the audio track in accordance with duration of graphical presentation of credits awarded for the bonus game.

* * * * *